US010848000B2

(12) United States Patent
Ogishima et al.

(10) Patent No.: US 10,848,000 B2
(45) Date of Patent: Nov. 24, 2020

(54) NON-CONTACT POWER RECEIVING DEVICE AND NON-CONTACT POWER RECEIVING METHOD

(71) Applicant: TOSHIBA TEC KABUSHIKI KAISHA, Tokyo (JP)

(72) Inventors: Takuya Ogishima, Isu Shizuoka (JP); Masakazu Kato, Numazu Shizuoka (JP)

(73) Assignee: TOSHIBA TEC KABUSHIKI KAISHA, Tokyo (JP)

(*) Notice: Subject to any disclaimer, the term of this patent is extended or adjusted under 35 U.S.C. 154(b) by 80 days.

(21) Appl. No.: 15/978,521

(22) Filed: May 14, 2018

(65) Prior Publication Data

US 2018/0351407 A1  Dec. 6, 2018

(30) Foreign Application Priority Data

Jun. 1, 2017  (JP) .................................. 2017-109358

(51) Int. Cl.
  *H02J 7/00*   (2006.01)
  *H02J 50/12*  (2016.01)
  *H02J 7/02*   (2016.01)
  *H04B 5/00*   (2006.01)
  *H02J 50/90*  (2016.01)
  *H02J 50/10*  (2016.01)

(52) U.S. Cl.
  CPC ............... *H02J 50/12* (2016.02); *H02J 7/00* (2013.01); *H02J 7/0068* (2013.01); *H02J 7/025* (2013.01); *H02J 50/10* (2016.02); *H02J 50/90* (2016.02); *H04B 5/0037* (2013.01); *H04B 5/0081* (2013.01)

(58) Field of Classification Search
  USPC ........................................................ 320/108
  See application file for complete search history.

(56) References Cited

U.S. PATENT DOCUMENTS

| 9,929,604 | B2 | 3/2018 | Watanabe et al. | |
|---|---|---|---|---|
| 2005/0225295 | A1* | 10/2005 | Sato | G06F 1/28 320/132 |
| 2014/0111137 | A1* | 4/2014 | Tanikawa | H01M 10/44 320/101 |

(Continued)

FOREIGN PATENT DOCUMENTS

| EP | 3 115 800 A1 | 1/2017 |
|---|---|---|
| WO | WO-2014/084628 A1 | 6/2014 |
| WO | WO-2015/155838 A1 | 10/2015 |

OTHER PUBLICATIONS

Search Report dated Aug. 2, 2018, received in corresponding European application No. 18 174 365.9, 10 pages.

*Primary Examiner* — Samuel Berhanu
(74) *Attorney, Agent, or Firm* — Foley & Lardner LLP

(57) ABSTRACT

A non-contact power receiving device is described which receives power from a non-contact power transmission device that transmits power using a power transmission coil, includes a power receiving coil, a power receiving circuit, and a power receiving control circuit. The power receiving coil is electromagnetically coupled to the power transmission coil. The power receiving circuit rectifies power that is generated in the power receiving coil. The power receiving control circuit temporarily increases a load that is connected to the power receiving circuit.

17 Claims, 7 Drawing Sheets

(56) References Cited

U.S. PATENT DOCUMENTS

2014/0246918 A1* 9/2014 Shijo ................ H01F 38/14
                                                    307/104
2017/0113557 A1* 4/2017 Tsukamoto ............ H02J 7/00

* cited by examiner

POSITIONAL DEVIATION: LARGE

CHARGING CANNOT BE PERFORMED

PLACE ON POWER TRANSMISSION BASE AGAIN

|  | CENTRAL PORTION OF MOUNTING SURFACE | | PLACE SLIGHTLY SEPARATED FROM CENTRAL PORTION | | FURTHER SEPARATED PLACE | |
|---|---|---|---|---|---|---|
| EFFICIENCY | 70% | | 50% | | 30% | |
| RECEPTION POWER | 1W | 5W | 1W | 5W | 1W | 5W |
| TRANSMISSION POWER | 1.4W | 7.1W | 2W | 10W | 3.3W | 16.7W |
| POWER TRANSMISSION PROPRIETY | OK | OK | OK | NG | OK | NG |

NON-CONTACT POWER RECEIVING DEVICE AND NON-CONTACT POWER RECEIVING METHOD

CROSS-REFERENCE TO RELATED APPLICATION

This application is based upon and claims the benefit of priority from Japanese Patent Application No. P2017-109358, filed Jun. 1, 2017, the entire contents or which are incorporated herein by reference.

FIELD

Embodiments described herein relate generally to a non-contact power receiving device and a non-contact power receiving method.

BACKGROUND

A non-contact power transmission apparatus that transmits power in a non-contact manner is becoming widespread. The non-contact power transmission apparatus includes a non-contact power transmission device that supplies power (transmits power) from a power transmission coil and a non-contact power receiving device that receives power supplied from the non-contact power transmission device by a power receiving coil. The non-contact power transmission device supplies power to the non-contact power receiving device in a state of being electromagnetically coupled with the non-contact power receiving device by an electromagnetic induction, a magnetic field resonance (resonance) or the like. The non-contact power transmission device includes a power transmission base in which the power transmission coil is provided. The non-contact power transmission device supplies power to the non-contact power receiving device installed on the power transmission base by generating a magnetic field from the power transmission coil at a frequency of, for example, approximately 100 kHz to 200 kHz. The non-contact power receiving device includes a secondary battery. The non-contact power receiving device performs charging processing (normal charging) of supplying a current (normal current) with a predetermined current value to the secondary battery by using the power received by the power receiving coil. In addition, if the remaining amount of the secondary battery of the non-contact power receiving device is in a nearly empty state, the non-contact power receiving device performs precharging or supplying a small current having a current value lower than a current value of the normal current so as to suppress damage to the secondary battery. If the remaining amount (voltage) of the secondary battery reaches a predetermined value, the non-contact power receiving device switches from precharging to normal charging.

Efficiency of power transmission between the power transmission coil and the power receiving coil decreases according to a magnitude of a position deviation (hereinafter, referred to as a positional deviation) between the center of the power transmission coil and the center of the power receiving coil. Accordingly, the transmission power required for the non-contact power receiving device to obtain a predetermined reception power increases according to the magnitude of the positional deviation. If a value of the transmission power supplied to the power transmission coil exceeds a preset threshold (rated output), the non-contact power transmission device has an over-current protection function for stopping the supply of the transmission power to the power transmission coil. Accordingly, if the amount of the positional deviation is large, the output may exceed the rated output, and at this time, the overcurrent protection function of the non-contact power transmission device is performed, and the supply of the transmission power stops.

In addition, in the non-contact power transmission device, a value of the transmission power supplied to the power transmission coil increases according to the magnitude of a load connected to the power receiving coil. When the non-contact power receiving device performs the precharging, the load connected to the power receiving coil is smaller than when the non-contact power receiving device performs the normal charging. Accordingly, even if the amount of positional deviation increases when the non-contact power receiving device performs the precharging, the transmission power does not increase to a level so as to exceed the rated power, and there is a possibility that the overcurrent protection function of the non-contact power transmission device is not performed. As a result, the remaining amount (voltage) of the secondary battery of the non-contact power receiving device reaches a predetermined value and charging is switched to the normal charging, and thereafter, the transmission power exceeds the rated power and supply of the transmission power stops. As such, in the precharging, there is a possibility that the charging is continued while no positional deviation is detected. That is, the supply of the transmission power finally stops due to the positional deviation only after the charging is switched to the normal charging, and thereby, there is a problem that, when the precharging is performed, it takes time to stop the supply of the transmission power due to the positional deviation.

DETAILED DESCRIPTION

A problem to be solved by the exemplary embodiment is to provide a non-contact power receiving device and a non-contact power receiving method which can detect a positional deviation in a short time even when precharging is performed.

A non-contact power receiving device according to one embodiment receives power from a non-contact power transmission device that transmits power using a power transmission coil, and includes a power receiving coil, a power receiving circuit, and a power receiving control circuit. The power receiving coil is electromagnetically coupled to the power transmission coil. The power receiving circuit rectifies power that is generated in the power receiving coil. The power receiving control circuit temporarily increases a load that is connected to the power receiving circuit.

Hereinafter, a non-contact power receiving device and a non-contact power receiving method according to some embodiments will be described with reference to the drawings.

First Embodiment

An outline of a non-contact power transmission apparatus 1 will be described.

Figure 1:
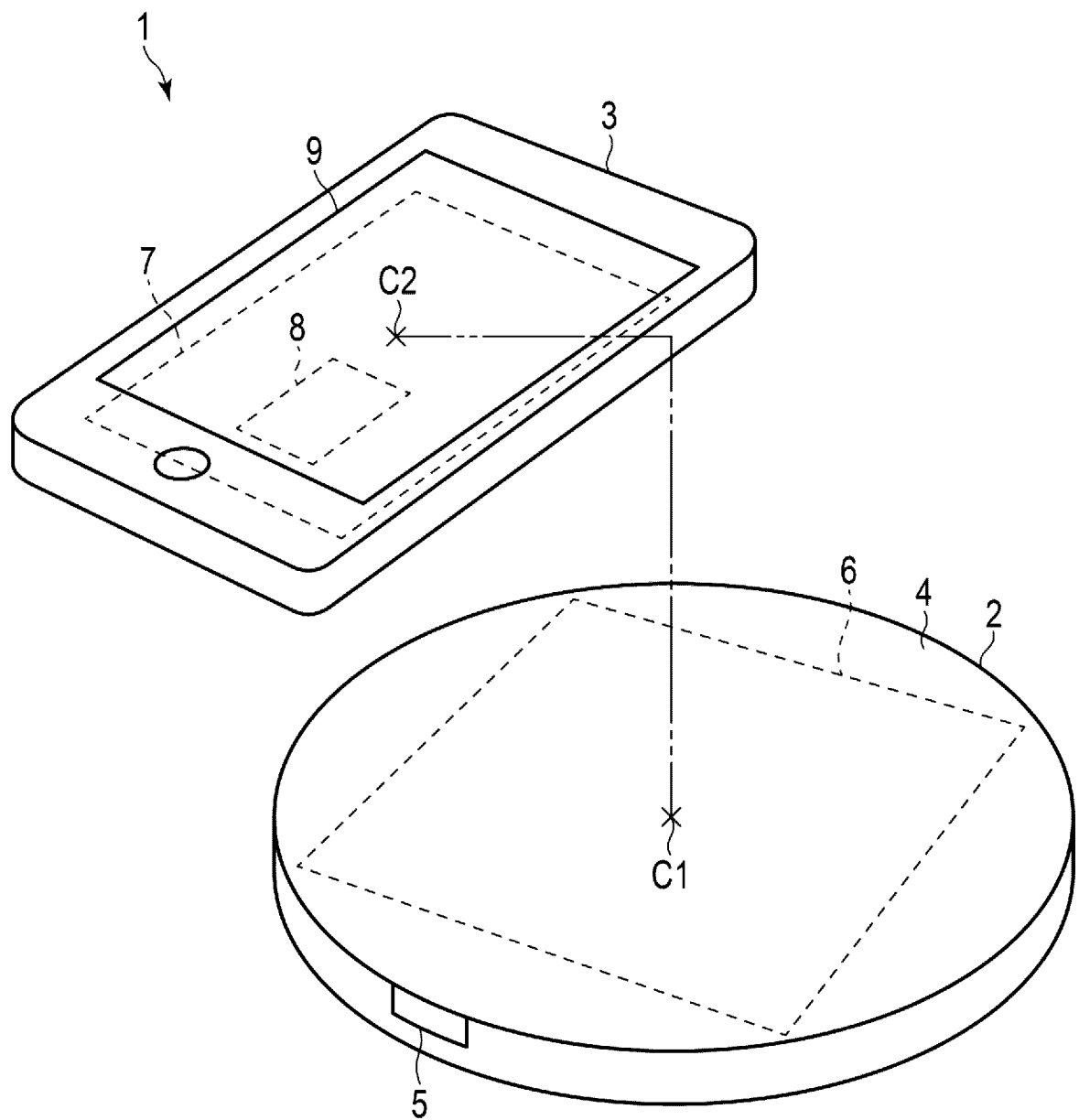
FIG. 1 is a diagram illustrating an example of an arrangement of a non-contact power transmission apparatus according to a first embodiment.

FIG. 1 is a diagram illustrating an example of an arrangement of the non-contact power transmission apparatus 1 according to the first embodiment. The non-contact power transmission apparatus 1 includes a non-contact power transmission device 2 that supplies power (transmits power) and a non-contact power receiving device 3 that receives power supplied from the non-contact power transmission device 2.

The non-contact power transmission device 2 supplies power to the non-contact power receiving device 3 in a state electromagnetically coupled to the non-contact power receiving device 3 by electromagnetic induction, magnetic field resonance (resonance) or the like. As illustrated in FIG. 1, the non-contact power transmission device 2 includes a power transmission base 4, a display unit 5, and a power transmission coil 6.

The power transmission base 4 is a portion in which a part of a case of the non-contact power transmission device 2 is formed in a flat plate shape, and the power transmission coil 6 is provided.

The display unit 5 is an indicator (for example, an LED, a display or the like) indicating a state of the non-contact power transmission device 2.

The power transmission coil 6 is a circuit that generates a magnetic field by using AC power. The power transmission coil 6 is configured by disposing a conductive wire in parallel with a surface of the power transmission base 4 on which the non-contact power receiving device 3 is positioned.

The non-contact power receiving device 3 is a device that receives the power transmitted from the non-contact power transmission device 1. The non-contact power receiving device 3 may be configured as a portable information terminal such as a smart phone or a tablet PC. In addition, the non-contact power receiving device 3 may be connected to terminals of the portable information terminal such as a smartphone or a tablet PC and may be configured to supply power transmitted from the non-contact power transmission device 2 to the portable information terminal. In addition, the non-contact power receiving device 3 includes a power receiving coil 7, a secondary battery 8, and a monitor 9 as illustrated in FIG. 1.

The power receiving coil 7 is an element that generates a current based on a change in the magnetic field. The power receiving coil 7 may be configured by disposing a conductive wire in parallel with any surface of a case of the non-contact power receiving device 3. Alternatively, the power receiving coil 7 may be configured by a printed board disposed in parallel with any one surface. If the non-contact power receiving device 3 is disposed in a state where the surface of the case of the non-contact power receiving device 3 on which the power receiving coil 7 is provided faces the power transmission base 4, the power receiving coil 7 is electromagnetically coupled to the power transmission coil 6 of the non-contact power transmission device 2.

The secondary battery 8 is charged with electric power generated in the power receiving coil 7 and supplies power to each unit of the non-contact power receiving device 3.

The monitor 9 is a display device that displays various screens.

The non-contact power transmission device 2 generates a magnetic field from the power transmission coil 6 by supplying AC power (transmission power) to the power transmission coil 6. The non-contact power transmission device 2 generates a magnetic field from the power transmission coil 6, thereby supplying the electric power to the non-contact power receiving device 3 via the power receiving coil 7 electromagnetically coupled to the power transmission coil 6.

The non-contact power receiving device 3 performs charging processing of storing power generated in the power receiving coil 7 in the secondary battery 8. The non-contact power receiving device 3 has a normal charging state in which the secondary battery 8 is charged by supplying a current (normal current) with a normal current value (first current value) to the secondary battery 8, and a precharging state in which the secondary battery 8 is charged by supplying a current (small current) with a small current value (second current value) smaller than the first current value to the secondary battery 8. Precharging is performed in a state in which remaining power of the secondary battery 8 is empty or nearly empty, and normal charging is performed after a voltage of the secondary battery 8 reaches a specified value.

Efficiency of power transmission between the power transmission coil 6 and the power receiving coil 7 decreases according to a magnitude of a deviation of a position (positional deviation) between a center C1 of the power transmission coil 6 and a center C2 of the power receiving coil 7 in a direction parallel to the surface on which the conductive wire of the power transmission coil 6 is disposed. Accordingly, transmission power required for the non-contact power receiving device 3 to obtain predetermined reception power increases according to the magnitude of the positional deviation.

In addition, a value of the transmission power supplied to the power transmission coil 6 in the non-contact power transmission device 2 increases according to a magnitude of a load connected to the power receiving coil 7.

Accordingly, the non-contact power receiving device 3 temporarily increases the load connected to the power receiving coil 7 during the precharging. Thereby, in a state in which the precharging is performed, the non-contact power receiving device 3 causes to temporarily supply (the power transmission coil 6) the same transmission power as when the normal charging is performed. Thereby, even if the non-contact power receiving device 3 precharges, the non-contact power transmission device 2 can detect an overcurrent caused by the positional deviation and stop power transmission.

Next, configurations of the non-contact power transmission device 2 and the non-contact power receiving device 3 will be described in detail.

Figure 2:
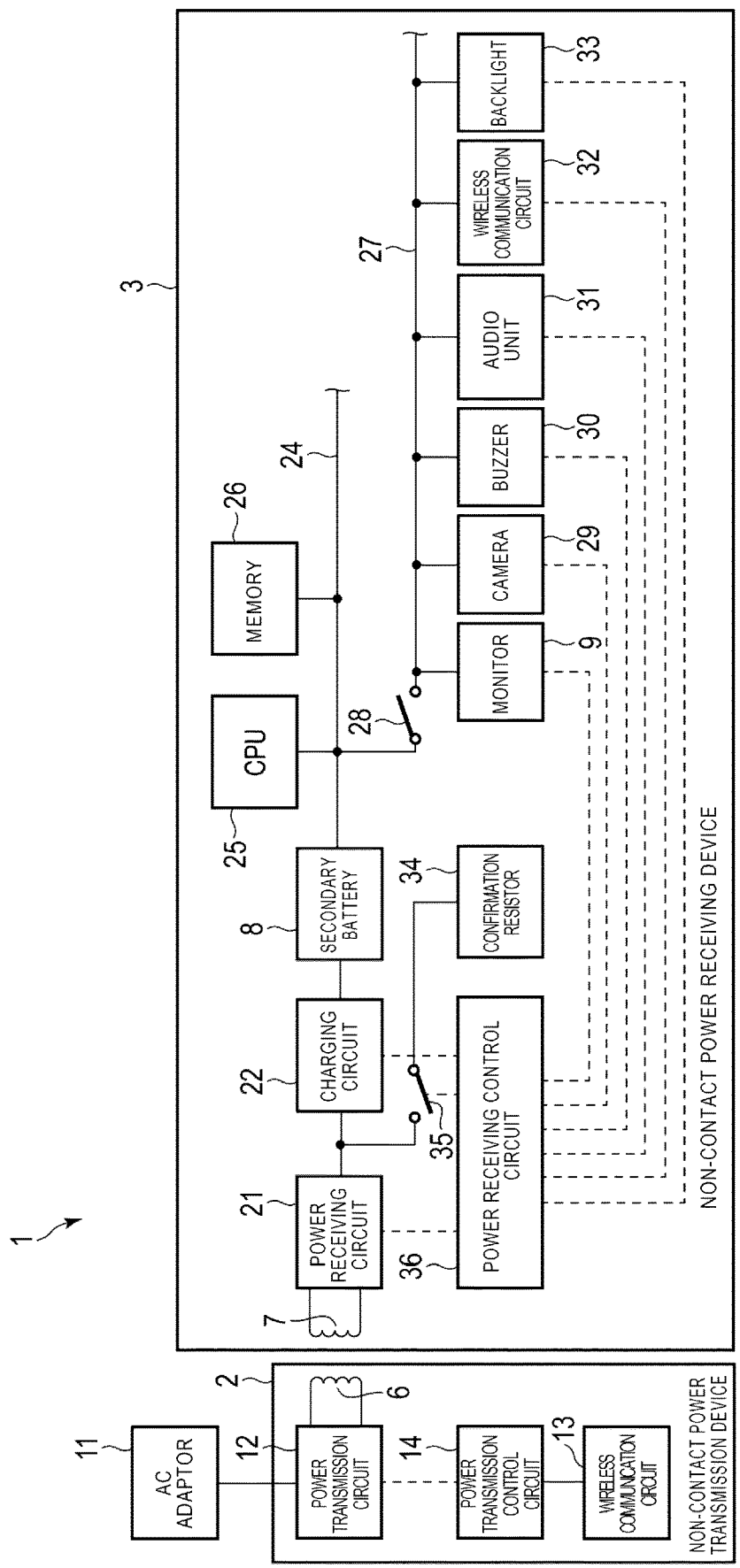
FIG. 2 is a diagram illustrating an example of an arrangement of a non-contact power transmission device and a non-contact power receiving device of the non-contact power transmission apparatus according to the first embodiment.

FIG. 2 is a diagram illustrating an example of an arrangement of the non-contact power transmission device 2 and the non-contact power receiving device 3 of the non-contact power transmission apparatus 1 according to the first embodiment.

Non-Contact Power Transmission Device 2

DC power is supplied to the non-contact power transmission device 2 from a commercial power source through a DC power source such as an AC adaptor 11. The non-contact power transmission device 2 operates either in a power transmission state in which power is supplied to the non-contact power receiving device 3 by a DC power source or in a standby state in which power is not supplied to the non-contact power receiving device 3. It is assumed that the non-contact power transmission device 2 performs power transmission for detecting installation of the non-contact power receiving device 3 on the power transmission base A in the standby state. In addition, a state in which power transmission is stopped due to some abnormality is also set as the standby state.

The non-contact power transmission device 2 includes the power transmission coil 6, a power transmission circuit 12, a wireless communication circuit 13, a power transmission control circuit 14, and the like.

The power transmission coil 6 is generally connected in series to a resonance capacitor which is not illustrated, and thereby, a resonance circuit (power transmission resonance circuit) is configured. However, the resonance capacitor is not required. The power transmission coil 6 generates a magnetic field, according to the transmission power supplied from the power transmission circuit 12.

The power transmission circuit 12 generates the transmission power based on DC power supplied from the AC adaptor 11 and supplies the transmission power to the power transmission coil 6. For example, if an electromagnetic induction method is used for the power transmission, the power transmission circuit 12 supplies the power transmission coil 6 with the transmission power with a carrier frequency of approximately 100 kHz to 200 kHz. In addition, for example, if a magnetic field resonance method is used for the power transmission, the power transmission circuit 12 supplies the power transmission coil 6 with the transmission power in a MHz bandwidth such as 6.78 MHz or 13.56 MHz. A frequency of the transmission power supplied by the power transmission circuit 12 to the power transmission coil 6 is not limited to the above frequency, and any frequency may be used as long as the frequency corresponds to the power transmission method. In addition, the frequency of the transmission power supplied by the power transmission circuit 12 to the power transmission coil 6 may change depending on a specification of the non-contact power receiving device 3.

The wireless communication circuit 13 is an interface for performing wireless communication with the non-contact power receiving device 3. The wireless communication circuit 13 performs the wireless communication at a frequency different from the frequency of power transmission. The wireless communication circuit 13 may be, for example, a wireless LAN using a bandwidth of 2.4 GHz or 5 GHz, a short distance wireless communication device which uses a bandwidth of 920 MHz, a communication device which uses infrared, or the like. Specifically, the wireless communication circuit 13 performs wireless communication with the non-contact power receiving device 3, according to a standard such as Bluetooth (registered trademark) or Wi-Fi (registered trademark). The wireless communication circuit 13 may perform signal processing for performing load modulation of a carrier wave of the power transmission and communicating with the non-contact power receiving device 3.

The power transmission control circuit 14 controls each operation of the power transmission circuit 12 and the wireless communication circuit 13. The power transmission control circuit 14 includes an arithmetic element and a memory. The arithmetic element executes arithmetic processing. The arithmetic element performs various types of processing, based on, for example, a program stored in the memory and data used for the program. The memory stores the program, the data used for the programs, and the like. The power transmission control circuit 14 may be configured by a microcomputer and/or an oscillation circuit, and the like.

For example, the power transmission control circuit 14 may control a frequency of the transmission power output from the power transmission circuit 12, and turns on or off an operation of the power transmission circuit 12. In addition, line power transmission control circuit 14 controls communication with the non-contact power receiving device 3 via the wireless communication circuit 13.

The power transmission control circuit 14 detects a current value of power supplied from the power transmission circuit 12 to the power transmission coil 6 or a current value supplied from the AC adaptor 11 to the power transmission circuit 12. The power transmission control circuit 14 compares the detected current value with a preset threshold. The threshold is a value corresponding to a rated output of the power transmission control circuit 14. If the detected current value is equal to or larger than the preset threshold, the power transmission control circuit 14 determines that an overcurrent is output. In this case, the power transmission control circuit 14 enters the standby state in which an output of the transmission power from the power transmission circuit 12 to the power transmission coil 6 stops according to the overcurrent protection function. That is, the power transmission control circuit 14 stops the output of the transmission power by the overcurrent protection function as a result of an increase in the transmission power due to the position deviation, an increase in a load of a power receiving-unit, presence of metallic foreign matter, and the like.

In addition, the power transmission control circuit 14 communicates with the non-contact power receiving device 3 via the wireless communication circuit 13, thereby determining whether or not the transmission power output from the power transmission circuit 12 is sufficient. For example, the power transmission control circuit 14 communicates with the non-contact power receiving device 3 via the wireless communication circuit 13, thereby, recognizes whether the reception power generated in the power receiving coil 7 of the non-contact power receiving device 3 is sufficient. If it is determined that the transmission power output from the power transmission circuit 12 is insufficient, the power transmission control circuit 14 increases the transmission power output from the power transmission circuit 12.

Regarding Non-Contact Power Receiving Device 3

The non-contact power receiving device 3 includes the power receiving coil 7, a power receiving circuit 21, a charging circuit 22, the secondary battery 8, a power source connection system 24, a CPU 25, a memory 26, a power source disconnection system 27, a power source switch 28, the monitor 9, a camera 29, a buzzer 30, an audio unit 31, a wireless communication circuit 32, a backlight 33, a confirmation resistor 34, a load adjustment switch 35, and a power receiving control circuit 36.

The power receiving coil 7 is connected in series or in parallel with a capacitor not illustrated, thereby, a resonance circuit (power receiving resonance circuit) is configured. If the non-contact power receiving device 3 is installed in the power transmission base 4 of the non-contact power transmission device 2, the power receiving coil 7 is electromagnetically coupled with the power transmission coil 6 of the non-contact power transmission device 2. The power receiving coil 7 generates an induction current by using the magnetic field output from the power transmission coil 6 of the non-contact power transmission device 2. That is, the resonance circuit configured by the power receiving coil 7 and the capacitor not illustrated functions as an AC power source that supplies AC power (reception power) to the power receiving circuit 21 connected to the resonance circuit.

For example, if the magnetic resonance method is used for the power transmission, it is preferable that a self-resonance frequency of the power receiving resonance circuit is configured so as to be the same as or substantially the same as a self resonance frequency of the power transmission resonance circuit of the non-contact power transmission device 2. Thereby, power transmission efficiency increases when the power receiving resonance circuit and the power transmission resonance circuit are electromagnetically coupled.

The power receiving circuit 21 rectifies the reception power supplied from the power receiving resonance circuit and converts the power into a DC power. The power receiving circuit 21 includes, for example, a rectification bridge configured by a plurality of diodes. A pair of input terminals of the rectification bridge is connected to the power receiving resonance circuit. The power receiving circuit 21 performs a full-wave rectification of the reception power supplied from the power receiving resonance circuit, thereby outputting DC power from a pair of output terminals. The charging circuit 22 and the load adjustment switch 35 are connected to the pair of output terminals of the power receiving circuit 21. The power receiving circuit 21 supplies the DC power to each of the charging circuit 22 and the load adjustment switch 35.

The charging circuit 22 converts the DC power supplied from the power receiving circuit 21 into DC power (charging power) used for charging processing. That is, the charging circuit 22 outputs the charging power for charging the secondary battery 8 with the reception power output from the power receiving circuit 21. For example, if the secondary battery 8 is charged by normal charging, the charging circuit 22 charges the secondary battery 8 with the first current value. In addition, for example, if the secondary battery 8 is charged by precharging, the charging circuit 22 charges the secondary battery 8 with the second current value smaller than the first current value.

Whether charging is performed by the normal charging or by the precharging is determined by the charging circuit 22 monitoring a voltage of the secondary battery 8. For example, if the secondary battery 8 indicates a voltage close to an empty state, the charging circuit 22 operates so as to precharge with the second current value with a small charging current. The power receiving control circuit 36 may monitor the voltage of the secondary battery 8 and control the charging circuit 22 by determining whether to perform the normal charging or the precharging.

The secondary battery 8 is charged with the charging power generated by the changing circuit 22 and is used for operations of various configurations of the non-contact power receiving device 3.

For example, the secondary battery 8 supplies power to the power source connection system 24. The power source connection system 24 is a circuit to which various configurations that cannot block supply of a power source are connected. The power source connection system 24 operates according to the reception power of the power receiving circuit 21 or the power supplied from the secondary battery 8. For example, the CPU 25 which is an arithmetic element for performing various types of processing of the non-contact power receiving device 3, the memory 26 which stores a program to be executed by the CPU 25, and the like are connected to the power source connection system 24. That is, the secondary battery 3 constantly supplies power to the CPU 25 and the memory 26 connected to the power source connection system 24.

In addition, for example, the secondary battery 8 supplies power to the power source disconnection system 27. The power source disconnection system 27 is a circuit to which various configurations capable of cutting off the supply of power are connected. The power source disconnection system 27 is connected to the secondary battery 8 via the power source switch 28. The power source disconnection system 27 is connected to the monitor 9, the camera 29, the buzzer 30, the audio unit 31, the wireless communication circuit 32, the backlight 33 illuminating the monitor 9 from behind, and the like.

The power source switch 28 is turned on or off under the control of the power receiving control circuit 36. The power source switch 28 is, for example, a switch configured by a MOSFET or a relay switch. If the power source switch 28 is turned on, the power source disconnection system 27 is connected to the secondary battery 8. If the power source switch 28 is turned off, the secondary battery 8 is disconnected from the power source disconnection system 27. That is, the power source switch 28 switches between a state in which power is supplied from the secondary battery 8 to the monitor 9, the camera 29, the buzzer 30, the audio unit 31, the wireless communication circuit 32, the backlight 33, and the like connected to the power source disconnection system 27, and a state in which the power is not supplied thereto.

The power source switch 28 may be provided respectively between each of the monitor 9, the camera 29, the buzzer 30, the audio unit 31, the wireless communication circuit 32, and the backlight 33, and the power source disconnection system 27 directly connected to the secondary battery 8. In addition, supply of the power from the secondary battery 8 may not be connected or disconnected by the power source switch 28, and various configurations connected to the power source disconnection system 27 may be switched between a mode in which a large amount of power is consumed and a mode in which only a small amount of power is consumed.

The wireless communication circuit 32 is an interface for performing wireless communication with the non-contact power transmission device 2. The wireless communication circuit 32 performs the wireless communication at a frequency different from a frequency of the power transmission. The wireless communication circuit 32 is, for example, a wireless LAN which uses a bandwidth of 2.4 GHz or 5 GHz, a short distance wireless communication device which uses a bandwidth of 920 MHz, a communication device which uses infrared, or the like. Specifically, the wireless communication circuit 32 performs wireless communication with the non-contact power transmission device 2 according to a standard such as Bluetooth (registered trademark) or Wi-Fi (registered trademark). The wireless communication circuit 32 may perform signal processing for performing load modulation of a carrier wave of the power transmission and performing communication with the non-contact power transmission device 2.

The confirmation resistor 31 has a predetermined resistance value. The confirmation resistor 34 is connected to the power receiving circuit 21 via the load adjustment switch 35. The resistance value of the confirmation resistor 34 is determined by a value by which the charging power supplied to the secondary battery 8 is consumed during the normal charging. For example, the resistance value of the confirmation resistor 34 is determined by the charging power supplied to the secondary battery 8 at the time of the normal charging, the charging power supplied to the secondary battery 8 at the time of the precharging, and loads of the charging circuit 22 and the secondary battery 8.

The load adjustment switch 35 is turned on or off under the control of the power receiving control circuit 36. The load adjustment switch 35 is, for example, a switch configured by a MOSFET or a relay switch. If the load adjustment switch 35 is turned on, the confirmation resistor 34 is connected to the power receiving circuit 21. If the load adjustment switch 35 is turned off, the power receiving circuit 21 is disconnected from the confirmation resistor 34. That is, the load adjustment switch 35 switches a state in which the charging circuit 22 and the secondary battery 8 are connected to the power receiving coil 7 and the power receiving circuit 21 as a load, and a state in which the charging circuit 22, the secondary battery 8, and the confirmation resistor 34 are connected to the power receiving coil 7 and the power receiving circuit 21 as a load.

The power receiving control circuit 35 controls the respective operations of the power receiving circuit 21, the charging circuit 22, the power source disconnect ion system 27, the wireless communication circuit 32, the load adjustment switch 35, and the like. The power receiving control circuit 36 includes an arithmetic element and a memory. The arithmetic element performs arithmetic processing. The arithmetic element performs various types of processing, based on, for example, a program stored in the memory and data used in the program. The memory stores the program and the data used for the program. The power receiving control circuit 36 may be configured by a microcontroller and/or an oscillation circuit and the like.

The power receiving control circuit 36 detects a current value of the charging current output from the charging circuit 22. The power receiving control circuit 36 compares the detected current value with a preset threshold. A threshold is a value corresponding to the charging current value supplied to the secondary battery 8 during the normal charging. Thereby, the power receiving control circuit 36 recognizes whether the charging circuit 22 operates in the normal charging or operates in the precharging.

The power receiving control circuit 36 temporarily turns on the load adjustment switch 35 if the detected current value is smaller than the preset threshold. Thereby, the power receiving control circuit 36 temporarily connects the confirmation resistor 34 to the power receiving circuit 21. That is, the power receiving control circuit 36 temporarily increases a load connected to the power receiving circuit 21. Thereby, the power receiving control circuit 36 temporarily increases the transmission power of the non-contact power transmission device 2. That is, the power receiving control circuit 36 temporarily increases the load such that the overcharging protection function of the non-contact power transmission device 2 is easily performed. A signal for turning on or off the load adjustment switch 35 using the power receiving control circuit 36 is referred to as a positional deviation confirmation signal. The positional deviation confirmation signal includes an ON period of a predetermined time and an OFF period of the predetermined time. A length of the ON period and a length of the OFF period are determined by a specification of the overcurrent protection function of the non-contact power transmission device 2 and may be any length.

Next, an operation of the non-contact power transmission device 2 will be described.

Figure 3:
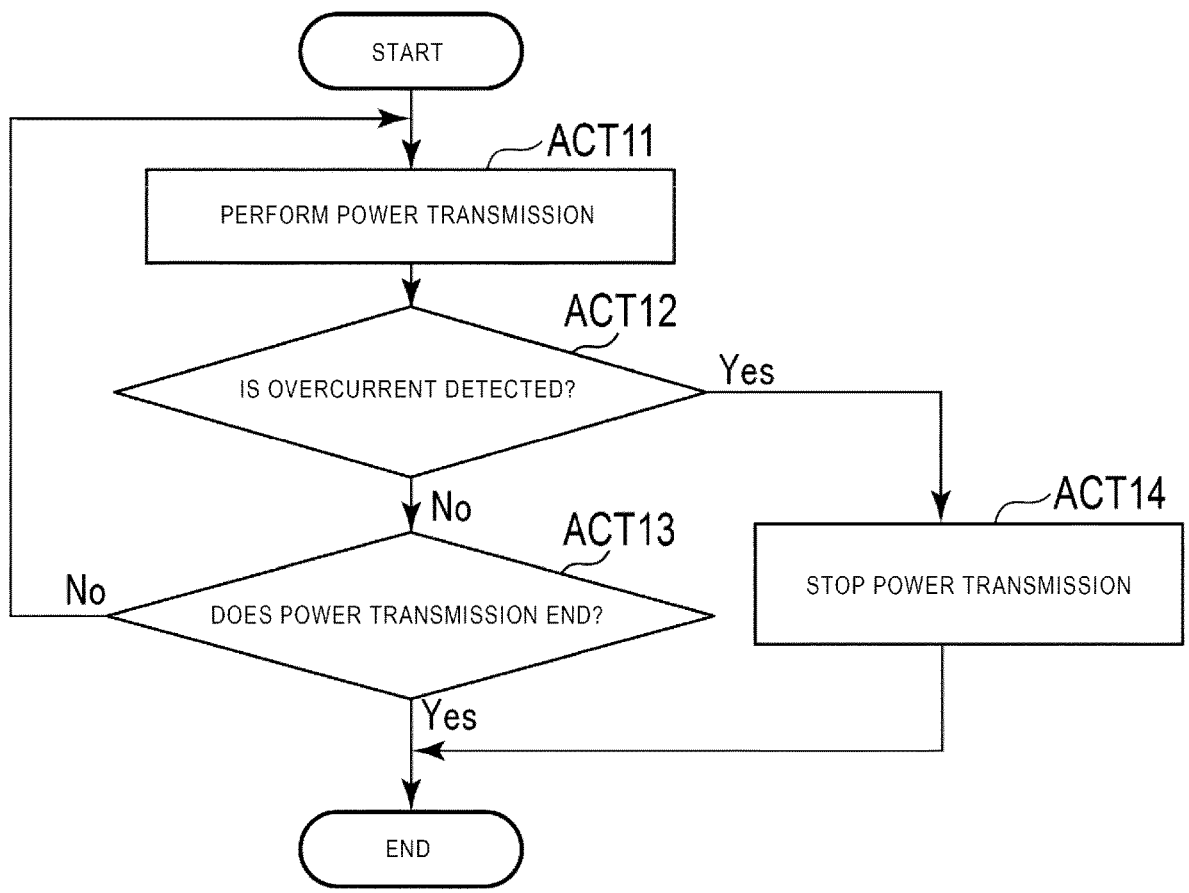
FIG. 3 is a diagram illustrating an example of an operation of the non-contact power transmission device according to the first embodiment.

FIG. 3 is an explanatory diagram illustrating an example of the operation of the non-contact power transmission device 2.

The power transmission control circuit 14 of the non-contact power transmission device 2 enters a standby state if being activated. If it is detected that the non-contact power receiving device 3 is placed on the power transmission base 4, the transmission power is supplied to the power transmission coil 6 and power transmission is performed (ACT 11).

The power transmission control circuit 14 detects a value of a current output from the power transmission circuit 12 or a value of a current input to the power transmission circuit from the AC adaptor 11, and determines whether or not an overcurrent is detected (ACT 12). That is, the power transmission control circuit 14 determines whether or not the value of the current output from the power transmission circuit 12 is equal to or larger than a preset threshold.

If the overcurrent is not detected (ACT 12, NO), the power transmission control circuit is determines whether or not power transmission ends (ACT 13). For example, the power transmission control circuit 14 determines that the power transmission ends, if the non-contact power receiving device 3 is removed from the power transmission base 4 or if the non-contact power receiving device 3 is completely charged. If the power transmission does not end, the power transmission control circuit 14 proceeds to ACT 11. If it is determined that the power transmission ends, the power transmission control circuit 14 stops the power transmission and enters a standby state in which the power transmission control circuit stands by for the non-contact power receiving device 3 to be placed on the power transmission base 4.

In addition, if the overcurrent is detected in ACT 12 (ACT 12, YES), the power transmission control circuit 14 stops the power transmission (ACT 14), enters the standby state, and is in a state in which the power transmission does not start until the non-contact power receiving device 3 is removed from the power transmission base 4. At the same time, an error display such as blinking of the display unit 5 is performed.

Next, an operation of the non-contact power receiving device 3 will be described.

Figure 4:
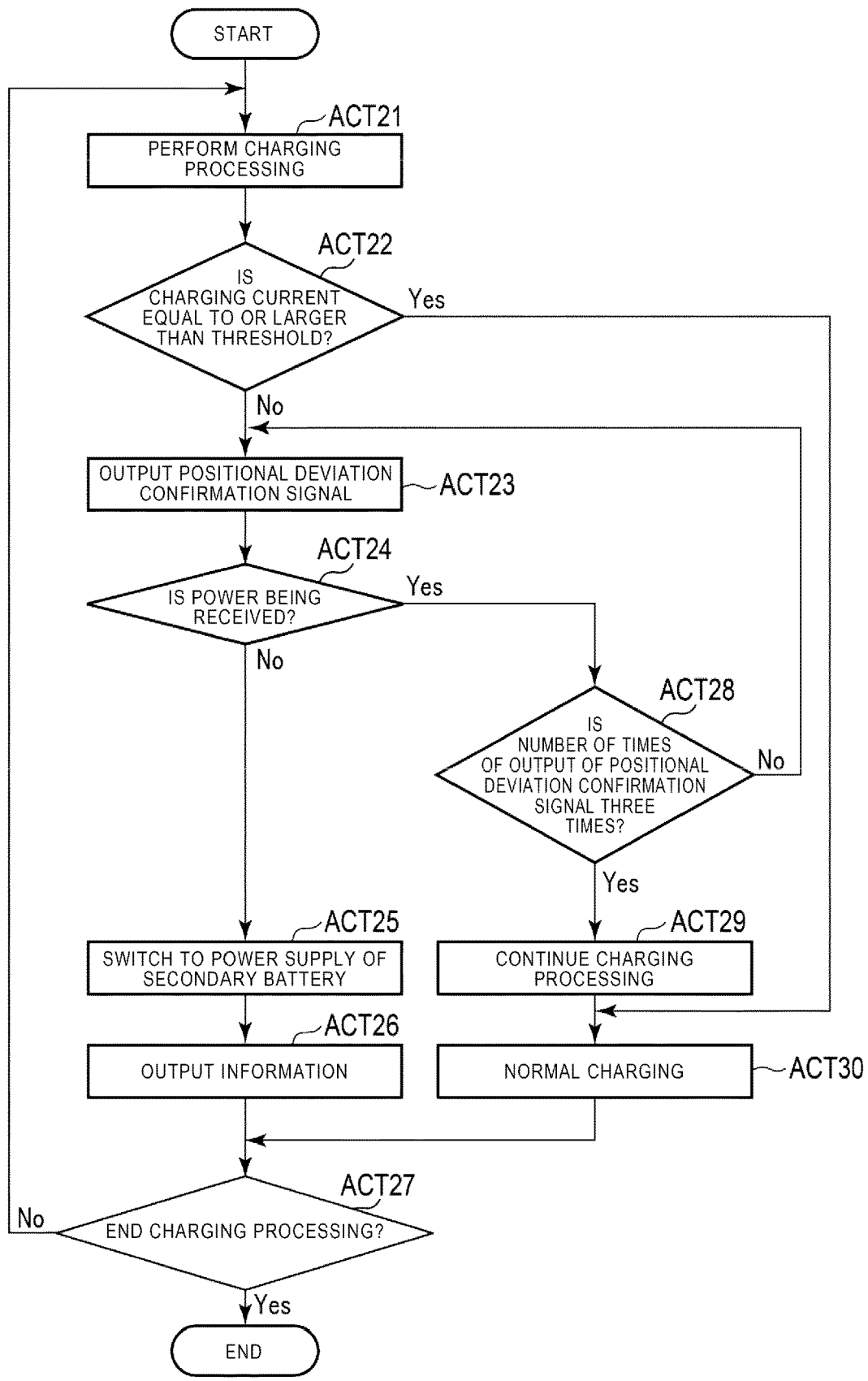
FIG. 4 is a diagram illustrating an example of an operation of the non-contact power receiving device according to the first embodiment.

FIG. 4 is an explanatory diagram illustrating an example of the operation of the non-contact power receiving device 3.

If the power receiving control circuit 36 of the non-contact power receiving device 3 receives the power from the non-contact power transmission device 2, the power receiving circuit 21 and the charging circuit 22 start processing of charging the secondary battery (ACT 21).

The power receiving control circuit 36 determines whether or not a current value of a charging current output from the charging circuit 22 is equal to or larger than a preset threshold (ACT 22). Thereby, the power receiving control circuit 36 determines whether the charging processing for the secondary battery 8 is the precharging performed by a small current or the normal charging performed by a normal current. If the current value of the charging current is equal to or larger than the preset threshold, the power receiving control circuit 36 determines that the charging processing is the normal charging. In addition, if the current value of the charging current is less than the preset threshold, the power receiving control circuit 36 determines that the charging processing is the precharging.

If it is determined that the current value of the charging current output from the charging circuit 22 is less than the preset threshold (ACT 22, NO), the power receiving control circuit 36 outputs a positional deviation confirmation signal (ACT 23). That is, the power receiving control circuit 36 temporarily adds the confirmation resistor 34 to a load connected to the power receiving coil 7 and the power receiving circuit 21 by turning on the load adjustment switch 35 for a certain period of time in response to the positional deviation confirmation signal. In addition, the power receiving control circuit 36 removes the confirmation resistor 34 from the load connected to the power receiving coil 7 and the power receiving circuit 21 by turning off the load adjustment switch 35 in response to the positional deviation confirmation signal. Specifically, the power receiving control circuit 36 outputs a positional deviation confirmation signal including, for example, an ON period of 1 second and an OFF period of 2 seconds.

By adding the confirmation resistor 34 to the load connected to the power receiving coil 7 and the power receiving circuit 21 as described above, the load connected to the power receiving coil 7 and the power receiving circuit 21 becomes approximately equal to the load at the time of the normal charging. As a result, the power transmission control circuit 14 can detect an increase in the transmission power due to a decrease in efficiency of power transmission due to a positional deviation. That is, if a current value of the transmission power is equal to or larger than the threshold, the power transmission control circuit 14 enters a standby state in which output of the transmission power from the power transmission circuit 12 to the power transmission coil 6 is stopped according to the overcurrent protection function. In other words, if the positional deviation is large, the power transmission control circuit 14 stops the output of the transmission power from the power transmission circuit 12 to the power transmission coil 6, according to the overcurrent protection function. In addition, if the positional deviation is small and the overcurrent protection function is not performed, the power transmission control circuit 14 continuously outputs the transmission power from the power transmission circuit 12 to the power transmission coil 6.

After outputting the positional deviation confirmation signal, the power receiving control circuit 36 determines whether or not the charging is continuously performed (ACT 24). That is, the power receiving control circuit 36 determines whether or not DG power is output from the power receiving circuit 21.

If it is determined that the charging is not continuously performed (ACT 24, NO), the power receiving control circuit 36 determines that power transmission from the non-contact power transmission device 2 is stopped. In this case, the power receiving control circuit 36 switches a power supply path such that the power is supplied from the secondary battery 8 to each configuration of the non-contact power receiving device 3 (ACT 25). Even if the output of the DC power from the power receiving circuit 21 is interrupted, the non-contact power receiving device 3 may be configured to further include a capacitor that supplies power to the power receiving control circuit 36 such that the power receiving control circuit 36 can operate ACT 24 and ACT 25.

Figures 5, 6:
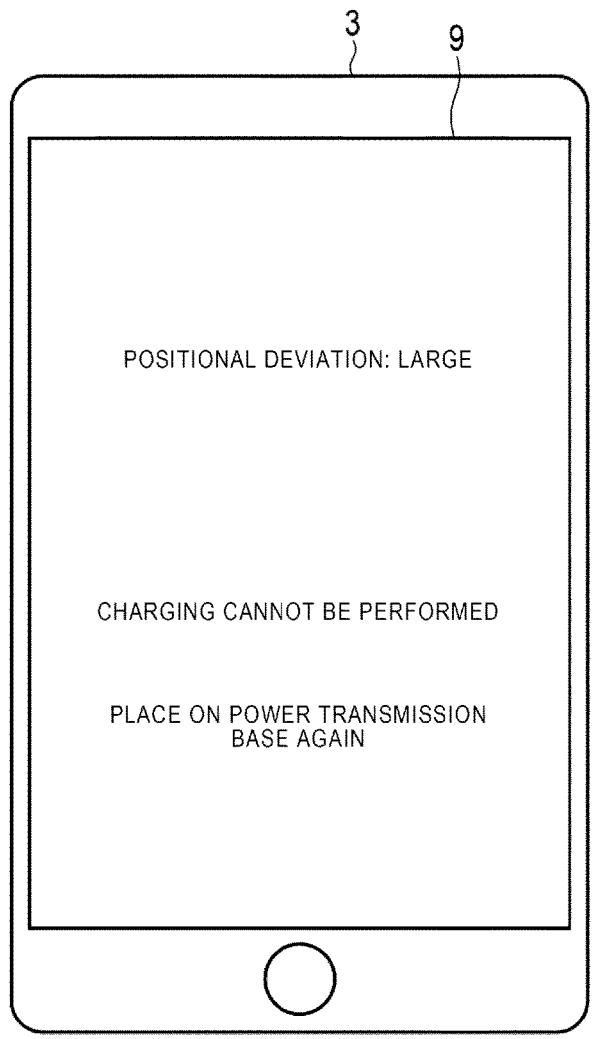
FIG. 5 is a diagram illustrating an example of the operation of the non-contact power receiving device according to the first embodiment.
FIG. 6 is a diagram illustrating an example of an operation of the non-contact power transmission apparatus according to the first embodiment.

Furthermore, the paver receiving control circuit 36 outputs information for notifying a user that the positional deviation is large, as illustrated in FIG. 5 (ACT 26). In the example of FIG. 5, the power receiving control circuit 36 outputs from the monitor 9 an instruction that the amount of the positional deviation is large, the charging cannot be performed, and prompts placing the non-contact power receiving device 3 on the power transmission base 4 again. The power receiving control circuit 36 may be configured to output information corresponding to a screen in FIG. 5 by a sound output or may be configured to notify other devices of information corresponding to the screen in FIG. 5. That is, the power receiving control circuit 36 causes a user to recognize that the positional deviation occurs by outputting an instruction indicating that the positional deviation occurs from an output unit, which outputs information, such as the monitor 9.

Furthermore, the power receiving control circuit 36 determines whether or not to end the charging processing (ACT 27). For example, the power receiving control circuit 36 determines that the charging processing is to be ended, if the secondary battery 8 is in a fully charged state.

If it is determined that the charging processing is to be ended (ACT 27, YES), the power receiving control circuit 36 stops the operation of the charging circuit 22 and ends the charging processing. In addition, if it is determined that the charging processing is not to be ended (ACT 27, NO), the power receiving control circuit 36 proceeds to the processing of the ACT 21.

In addition, if it is determined that charging is continuously performed in ACT 24 (ACT 24, YES), the power receiving control circuit 36 determines whether or not the number of times of output of the positional deviation confirmation signal reaches a preset number of times (for example, three times) (ACT 28). If it is determined that the number of times of the output of the positional deviation confirmation signal does not reach the preset number of times (ACT 28, NO), the power receiving control circuit 36 proceeds to the processing of ACT 23 and outputs the positional deviation confirmation signal again. Thereby, the power receiving control circuit 36 can improve accuracy of the overcurrent protection function of the non-contact power transmission device 2.

If it is determined that the number of times of the output of the positional deviation confirmation signal reaches the preset number of times (ACT 28, YES), the power receiving control circuit 36 determines that power transmission from the non-contact power transmission device 2 is continued and continuously performs the charging processing (ACT 29). If the voltage of the secondary battery 3 detected by the charging circuit 22 is equal to or larger than a certain value, the precharging is switched to the normal charging operation. That is, the charging circuit 22 charges the secondary battery 8 by performing the normal charging (ACT 30) and proceeds to ACT 27.

In addition, if it is determined that the current value of the charging current output from the charging circuit 22 is equal to or larger than the preset threshold in ACT 22 (ACT 22, YES), the charging circuit 22 proceeds to the processing of ACT 30 and charges the secondary battery 8 by the continuous normal charging.

In the above example, although it is described that whether to perform the normal charging or the precharging is determined based on the charging current and the threshold, the power receiving control circuit 36 may be configured to determine whether to perform the normal charging or the precharging, according to a voltage value of the secondary battery 8, and may be configured to control the charging circuit 22, based on the above determination.

FIG. 6 is a diagram illustrating an example of the transmission power of the power transmission circuit 12, the reception power of the power receiving circuit 21, and power transmission propriety (whether or not overcurrent protection functions), when an installation position of the non-contact power receiving device 3 on the power transmission base 4 is actually changed by using the non-contact power transmission apparatus 1.

If it is assumed that (1) the positional deviation between the center C1 of the power transmission coil 6 and the center C2 of the power receiving coil 7 is small, (2) the positional deviation between the center C1 of the power transmission coil 6 and the center C2 of the power receiving coil 7 is medium, and (3) the positional deviation between the center C1 of the power transmission coil 6 and the center C2 of the power receiving coil 7 is large, in the example of (1), since efficiency is 70%, it is necessary to set the transmission power to 1.4 W so as to set the reception power to 1 W corresponding to the precharging and it is necessary to set the transmission power to 7.1 W so as to set the reception power to 5 W corresponding to the normal charging. In the example of (2), since efficiency is 50%, it is necessary to set the transmission power to 2 W so as to set the reception power to 1 W and it is necessary to set the transmission power to 10 W so as to set the reception power to 5 W. In addition, in the example of (3), since efficiency is 30%, it is necessary to set the transmission power to 3.3 W so as to set the reception power to 1 W and it is necessary to set the transmission power to 16.7 W so as to set the reception power to 5 W.

For example, it is assumed that a rated output of the non-contact power transmission device 2 is 8 W. In this case, during the precharging, the overcurrent protection function is not performed and the positional deviation cannot be detected, in any example of (1), (2), and (3). However, during the normal charging, the transmission power exceeds the rated output, the overcurrent protection function is performed, and power transmission stops, in the examples of (2) and (3).

As described above, the non-contact power receiving device 3 includes the power receiving coil 7, the power receiving circuit 21 that rectifies the power generated in the power receiving coil 7, the charging circuit 22 that charges the secondary battery 8 by using the reception power output from the power receiving circuit 21, and the power receiving control circuit 36 that controls the operations of the power receiving circuit 21 and the like. The charging circuit 22 controls charging such that the secondary battery is charged by either the normal charging for charging the secondary battery with a normal current or the precharging for charging the secondary battery with a small current having a lower current value than a value of the normal current. The power receiving control circuit 36 temporarily increases a load connected to the power receiving circuit 21 during the precharging and consumes the same level of power as the normal charging. Thereby, the power receiving control circuit 36 can cause the non-contact power transmission device 2 to detect the positional deviation of the non-contact power receiving device 3 even while the non-contact power receiving device 3 performs the precharging. As a result, the non-contact power receiving device 3 can cause the non-contact power transmission device 2 to detect the positional deviation in a short time.

In the first embodiment, it is described that the power receiving control circuit 36 increases the load connected Co the power receiving circuit 21 by connecting the confirmation resistor 34 to the power receiving circuit 21 during the precharging, but embodiments are not limited to this configuration. The power receiving control circuit 36 may be configured to increase the load connected to the power receiving circuit 21 by any method. For example, the power receiving control circuit 36 may be configured to increase a load level of the CPU 25 connected to the power source connection system 24 and to set a load corresponding to a current in the normal charging. In this case, the confirmation resistor 34 and the load adjustment switch 35 can be omitted. For example, if is possible to increase a load of the CPU 25 by activating a specific application operating in a background. That is, the power receiving control circuit 36 temporarily increases the load connected to the power receiving circuit 21 by causing an arithmetic element to perform predetermined processing.

Second Embodiment

Figure 7:
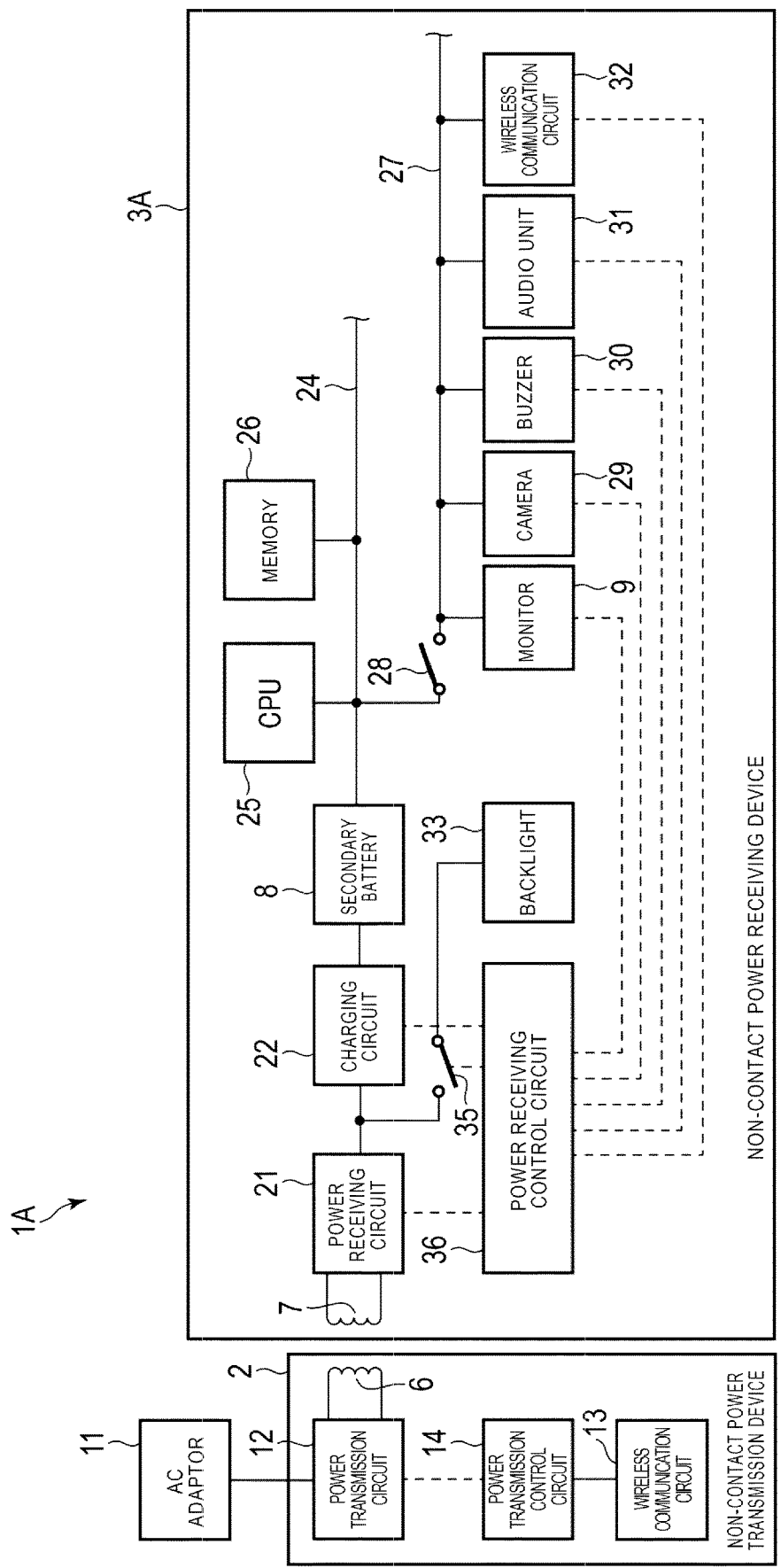
FIG. 7 is a diagram illustrating an example of an arrangement or a non-contact power transmission device and a non-contact power receiving device of a non-contact power transmission apparatus according to a second embodiment.

FIG. 7 illustrates an example of a non-contact power transmission apparatus 1A according to a second embodiment. The same reference numerals or symbols are attached to the same configurations as in the first embodiment, and detailed description thereof will be omitted. The non-contact power transmission apparatus 1A includes the non-contact power transmission device 2 and a non-contact power receiving device 3A.

The non-contact power receiving device 3A according to the second embodiment increases a load connected to the power receiving circuit 21 by connecting any one of various configurations connected to the power source disconnection system 27 during precharging to the power receiving circuit 21.

The non-contact power receiving device 3A includes the power receiving coil 7, the power receiving circuit 21, the charging circuit 22, the secondary battery 8, the power source connection system 24, the CPU 25, the memory 26, the power source disconnection system 27, the power source switch 28, the monitor 9, the camera 29, the buzzer 30, the audio unit 31, the wireless communication circuit 32, the backlight 33, the load adjustment switch 35, and the power receiving control circuit 36.

In the non-contact power receiving device 3A, the backlight 33 is connected to the power receiving circuit 21 via the load adjustment switch 35. A load of the backlight 33 is configured to a value for consuming DC power supplied to the secondary battery 8 during normal charging.

The power receiving control circuit 36 turns on or off the load adjustment switch 35, thereby, switching a state in which the charging circuit 22 and the secondary battery 8 are connected to the power receiving coil 7 and the power receiving circuit 21 as a load, and a state in which the charging circuit 22, the secondary battery 8, and the backlight 33 are connected to the power receiving coil 7 and the power receiving circuit 21 as a load.

More specifically, the power receiving control circuit 36 detects a current value of a charging current output from the charging circuit 22. If the detected current value is smaller than a preset threshold, the power receiving control circuit 36 temporarily turns or the load adjustment switch 35. Thereby, the power receiving control circuit 35 temporarily connects the backlight 33 to the power receiving circuit 21. That is, the power receiving control circuit 36 temporarily increases a load connected to the power receiving circuit 21. Thereby, the power receiving control circuit 36 temporarily increases transmission power of the non-contact power transmission device 2. That is, the power receiving control circuit 36 temporarily increases the load such that the overcharging protection function can be easily performed in the non-contact power transmission device 2.

As described above, the non-contact power receiving device 3A includes any one of configurations of the power source disconnection system 27 for being operated according to reception power of the power receiving circuit 21, and the load adjustment switch 35 that switches connection to the power receiving circuit 21. The power receiving control circuit 36 turns on the load adjustment switch 35 and connects the configuration of the power source disconnection system 27 to the power receiving circuit 21, and thereby, the load connected to the power receiving circuit 21 temporarily increases.

According to such a configuration, there is no need to provide the confirmation resistor 34. Accordingly, the circuit can be simplified. In addition, since the backlight 33 of the monitor 9 repeats turn-on and turn-off when the power receiving control circuit 36 outputs the positional deviation confirmation signal, it is easy for the user to visually recognize that charging starts.

Third Embodiment

Figure 8:
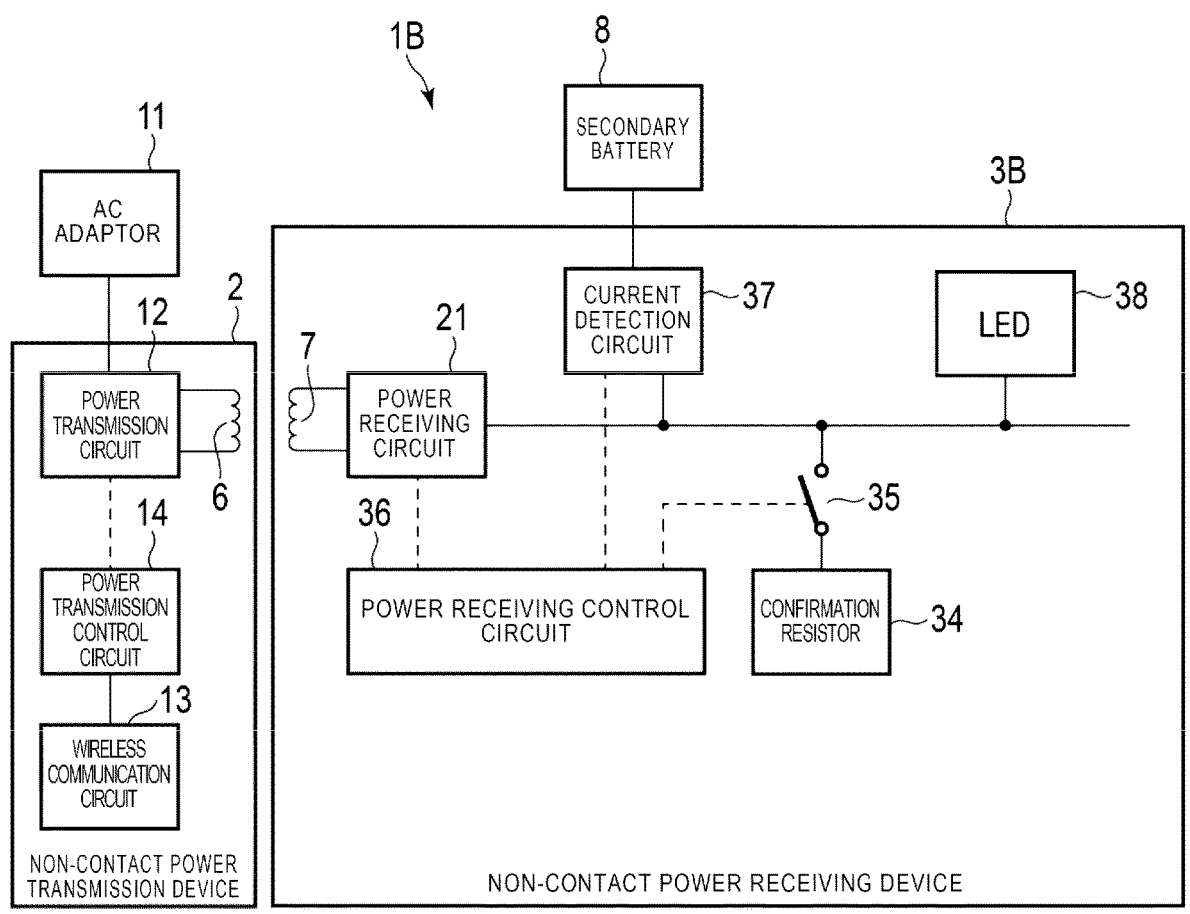
FIG. 8 is a diagram illustrating an example of an arrangement of a non-contact power transmission device and a non-contact power receiving device of a non-contact power transmission apparatus according to a third embodiment.

FIG. 8 illustrates an example of a non-contact power transmission apparatus 1B according to a third embodiment. The same reference numerals or symbols are attached to the same configurations as in the first embodiment, and a detailed description thereof will be omitted. The non-contact power transmission apparatus 1B includes the non-contact power transmission device 2 and a non-contact power receiving device 3B.

For example, the non-contact power receiving device 3B according to the third embodiment is configured to supply reception power generated in the power receiving coil 7 and the power receiving circuit 21 to an external electronic device that charges the secondary battery 8.

The non-contact power receiving device 3B includes the power receiving coil 7, the power receiving circuit 21, the confirmation resistor 34, the load adjustment switch 35, the power receiving control circuit 36, a current detection circuit 37, and an LED 38.

The current detection circuit 37 is connected to an output terminal of the power receiving circuit 21 and detects a current value of reception power supplied from the power receiving circuit 21 to the external secondary battery 8. The current detection circuit 37 supplies the detected current value to the power receiving control circuit 36.

The LED 38 is connected to the output terminal of the power receiving circuit 21 and is turned on by the reception power output from the power receiving circuit 21.

The power receiving control circuit 36 of the non-contact power receiving device 3B compares a current value of a charging current output from the power receiving circuit 21 to an external device, that is, a current value supplied from the current detection circuit 37 with a preset threshold. The power receiving control circuit 36 temporarily turns on the load adjustment switch 35 if the current value supplied from the current detection circuit 37 is smaller than the preset threshold. Thereby, the power receiving control circuit 36 temporarily connects the confirmation resistor 34 to the power receiving circuit 21. That is, the power receiving control circuit 36 temporarily increases a load connected to the power receiving circuit 21. Thereby, the power receiving control circuit 36 temporarily increases transmission power of the non-contact power transmission device 2. That is, the power receiving control circuit 36 temporarily increases the load such that the overcharging protection function can be easily performed by the non-contact power transmission device 2.

As such, even in the configuration of supplying the reception power output from the power receiving circuit 21 to the external device, a positional deviation of the non-contact power receiving device 3B can be detected by the non-contact power transmission device 2 in the same manner as in the first embodiment. Furthermore, the overcharging protection function is performed in the non-contact power transmission device 2, and if the power transmission stops, the LED 38 is turned off. As a result, it is possible for a user to visually recognize that charging is not being performed.

The functions described above in the respective embodiments can be realized not only by a configuration which uses hardware but also by installing a program in which each function is described by using software into a computer. In addition, each function may be configured by selecting either the software or the hardware as appropriate.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fail within the scope and spirit of the inventions.

What is claimed is:

1. A non-contact power receiving device which is configured to receive power from a non-contact power transmission device that transmits power using a power transmission coil, the non-contact power receiving device comprising:
 a power receiving coil configured to be electromagnetically coupled to the power transmission coil;
 a power receiving circuit configured to rectify power that is generated in the power receiving coil;
 a power receiving control circuit configured to temporarily increase a load that is connected to the power receiving circuit; and
 an output device configured to output information,
 when the load that is connected to the power receiving circuit temporarily increases and power transmission from the non-contact power transmission device stops, the power receiving control circuit is configured to determine that positional deviation between the power receiving coil and the power transmission coil occurs and output, through the output device, an instruction indicating that the positional deviation occurs.

2. The non-contact power receiving device according to claim 1, further comprising:
 a charging circuit configured to output charging power for charging a secondary battery using reception power output from the power receiving circuit,
 wherein the charging circuit is configured to perform either one of normal charging of outputting charging power for charging the secondary battery with a normal current, or precharging of outputting charging power for charging the secondary battery with a precharging current having a lower current value than the normal current, and wherein the power receiving control circuit is configured to perform control to temporarily increase the load that is connected to the power receiving circuit, when the charging circuit performs the precharging.

3. The non-contact power receiving device according to claim 2, wherein the charging circuit is configured to determine whether normal charging or precharging is to be performed based on the charging circuit monitoring a voltage of the secondary battery.

4. The non-contact power receiving device according to claim 1, further comprising:

a charging circuit configured to output charging power for charging a secondary battery using reception power output from the power receiving circuit, wherein the power receiving control circuit is configured to detect a current value of the charging current output from the charging circuit and to temporarily increase the load that is connected to the power receiving circuit, when the detected current value is smaller than a threshold.

5. The non-contact power receiving device according to claim 1, further comprising:

a confirmation resistor configured to consume reception power of the power receiving circuit; and a load adjustment switch configured to switch a connection between the confirmation resistor and the power receiving circuit, wherein the power receiving control circuit is configured to temporarily increase the load that is connected to the power receiving circuit by turning on the load adjustment switch and connecting the confirmation resistor to the power receiving circuit.

6. The non-contact power receiving device according to claim 1, further comprising:

an arithmetic element configured to operate according to reception power of the power receiving circuit, wherein the power receiving control circuit is configured to temporarily increase the load that is connected to the power receiving circuit by causing the arithmetic element to perform predetermined processing.

7. The non-contact power receiving device according to claim 1, further comprising:

a power source disconnection system configured to operate according to reception power of the power receiving circuit; and a load adjustment switch configured to switch a connection between the power source disconnection system and the power receiving circuit, wherein the power receiving control circuit is configured to turn on the load adjustment switch and connect the power source disconnection system to the power receiving circuit, to temporarily increase the load that is connected to the power receiving circuit.

8. The non-contact power receiving device according to claim 1, wherein the output device comprises one of a screen or a sound output device.

9. The non-contact power receiving device according to claim 1, further comprising a backlight, wherein the power receiving control circuit is configured to temporarily increase a load that is connected to the power receiving circuit by connecting the backlight to the power receiving circuit.

10. A non-contact power receiving method that is used for a non-contact power receiving device including a power receiving coil which is electromagnetically coupled to a power transmission coil of a non-contact power transmission device that transmits power, and a power receiving circuit which rectifies power that is generated in the power receiving coil, the method comprising:

temporarily increasing a load that is connected to the power receiving circuit using the non-contact power receiving device;

when the load that is connected to the power receiving circuit temporarily increases and power transmission from the non-contact power transmission device stops, determining that positional deviation between the power receiving coil and the power transmission coil occurs; and outputting, through the output device, an instruction indicating that the positional deviation occurs.

11. The non-contact power receiving method according to claim 10, wherein the temporarily increasing the load is performed when precharging a secondary battery of the non-contact power receiving device is performed, wherein during precharging the secondary battery is charged with a precharging current having a lower current value than a normal current for normal charging of the secondary battery.

12. The non-contact power receiving method according to claim 11, wherein whether normal charging or precharging is to be performed is based on a monitored voltage of the secondary battery.

13. The non-contact power receiving method according to claim 10, further comprising detecting a current value provided to a secondary battery, and increasing the load that is connected to the power receiving circuit when the detected value is smaller than a threshold.

14. The non-contact power receiving method according to claim 10, wherein the temporarily increasing the load is performed by connecting a confirmation resistor to the power receiving circuit.

15. The non-contact power receiving method according to claim 10, wherein the temporarily increasing the load is performed by causing an arithmetic element to perform predetermined processing.

16. The non-contact power receiving method according to claim 10, wherein the output device comprises one of a screen or a sound output device.

17. The non-contact power receiving method according to claim 10, wherein the load that is connected to the power receiving circuit is temporarily increased by connecting a backlight of the non-contact power receiving device to the power receiving circuit.

* * * * *